United States Patent
Johnson et al.

(10) Patent No.: US 10,625,726 B2
(45) Date of Patent: Apr. 21, 2020

(54) HYDRAULIC SYSTEM FOR BRAKES

(71) Applicant: Caterpillar SARL, Geneva (CH)

(72) Inventors: Steven Edward Johnson, Washington, IL (US); Adam Adeeb, Seaham (GB)

(73) Assignee: Caterpillar SARL, Geneva (CH)

( * ) Notice: Subject to any disclaimer, the term of this patent is extended or adjusted under 35 U.S.C. 154(b) by 51 days.

(21) Appl. No.: 15/992,578

(22) Filed: May 30, 2018

(65) Prior Publication Data

US 2018/0370514 A1    Dec. 27, 2018

(51) Int. Cl.
   *B60T 13/68*    (2006.01)
   *B60T 8/26*    (2006.01)
   *B60T 8/48*    (2006.01)
   *B60T 13/14*    (2006.01)

(52) U.S. Cl.
   CPC .............. *B60T 13/686* (2013.01); *B60T 8/26* (2013.01); *B60T 8/4809* (2013.01); *B60T 13/141* (2013.01)

(58) Field of Classification Search
   CPC ......... B60T 13/686; B60T 13/141; B60T 8/34
   See application file for complete search history.

(56) References Cited

U.S. PATENT DOCUMENTS

| | | | |
|---|---|---|---|
| 3,910,643 A | 10/1975 | Kobashi et al. | |
| 5,171,071 A | 12/1992 | Takata et al. | |
| 5,236,252 A | 8/1993 | Phipps | |
| 5,941,608 A * | 8/1999 | Campau | B60T 7/042 303/113.4 |
| 7,311,163 B2 | 12/2007 | Oliver | |
| 2008/0303342 A1 * | 12/2008 | Kodaka | B60G 17/005 303/167 |

FOREIGN PATENT DOCUMENTS

| | | | |
|---|---|---|---|
| DE | 3119831 A1 * | 12/1982 | ............ B60T 13/148 |
| EP | 2154039 B1 | 1/2013 | |
| GB | 2008216 A | 5/1979 | |
| GB | 2094428 A | 9/1982 | |

OTHER PUBLICATIONS

United Kingdom Search Report for Application No. GB 1710072,8; filed on Jun. 23, 2017.

* cited by examiner

*Primary Examiner* — Melanie Torres Williams

(57) ABSTRACT

A hydraulic system for a vehicle in which the first and second brake valves are arranged in a parallel configuration. The pressure inlet of the first and second brake valves are connected to a source of hydraulic fluid and the exhaust outlets of the first and second brake valves are connected to the first and second brakes, respectively. The control inlets of the first and second brake valves are directly responsive to a braking signal from an operator of the vehicle. First and second control valves are configured to selectively provide hydraulic fluid to the control inlet of the first and second brake valves, respectively.

12 Claims, 2 Drawing Sheets

HYDRAULIC SYSTEM FOR BRAKES

CROSS-REFERENCE TO RELATED APPLICATION

This application claims priority under 35 U.S.C. § 119 and the Paris Convention to United Kingdom Application No. 1710072.8 filed on Jun. 23, 2017.

TECHNICAL FIELD

The present disclosure relates to a hydraulic system for brakes, and in particular to a hydraulic system for a vehicle having first and second brakes.

BACKGROUND

Vehicle brakes are often controlled by hydraulic systems, in which a pedal-actuated valve is used to control supply of hydraulic fluid to the brakes. Some vehicles have more than one brake system, for instance front and rear brakes. Hydraulic systems for such vehicles use two valve sections, one for the front brakes and the other for the rear brakes, which allow flow of hydraulic fluid to the front and rear brakes when a brake pedal is pressed by an operator. Prior hydraulic systems often have the two valve sections configured in series which may result in brake pressure bias and/or overshoot. Bias occurs when the brake pressure provided to the two brake systems is not equal; overshoot occurs when the brake pressure exceeds the nominal pressure setting of the pedal valve. Bias and overshoot may have a negative effect on brake and axle component durability.

Many vehicles have a second actuation system for the brakes, which may be used for retarding, anti-skid braking or dynamic brake control. Typically the hydraulic system includes a solenoid-controlled valve for each brake system to provide the second actuation system and additional valves to resolve and determine whether pedal-actuation or solenoid-actuation will control the supply of hydraulic fluid to the brake systems. Inclusion of additional valves may increase bias and overshoot between brake systems, and may increase overall cost of the hydraulic system.

SUMMARY OF THE DISCLOSURE

In an aspect of the present disclosure, a hydraulic system for a vehicle having first and second brakes is provided. The hydraulic system comprises a source of hydraulic fluid, a first brake valve and a second brake valve. The first and second brake valves have a pressure inlet, an exhaust outlet and a control inlet. The hydraulic system is characterized by the first and second brake valves being arranged in a parallel configuration, wherein the pressure inlet of the first and second brake valves are connected to the source of hydraulic fluid, and the exhaust outlet of the first and second brake valves being connected to the first and second brakes, respectively. The control inlets of the first and second brake valves are directly responsive to a braking signal from an operator of the vehicle. The hydraulic system further comprises a first control valve and a second control valve, each connected to the source of hydraulic fluid, wherein the first and second control valves are configured to selectively provide hydraulic fluid to the control inlet of the first and second brake valves, respectively.

In another aspect of the present disclosure, a method for controlling hydraulic fluid in a vehicle having first and second brakes is provided. The method is characterised by providing a source of hydraulic fluid, and arranging a first brake valve and a second brake valve in a parallel configuration, wherein a pressure inlet of the first and second brake valves are connected to a source of hydraulic fluid, and an exhaust outlet of the first and second brake valves are connected to the first and second brakes, respectively. The method is further characterised by controlling operation of the first and second brake valves such that the first and second brake valves provide hydraulic fluid to the first and second brakes, respectively, in response to a braking signal from an operator of the vehicle. The method is further characterised by controlling operation of the first and second brake valves such that the first brake valve provides hydraulic fluid to the first brake in response to a first control signal, and the second brake valve provides hydraulic fluid to the second brake in response to a second control signal.

Other features and aspects of this disclosure will be apparent from the following description and the accompanying drawing.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts.

Figure 1:
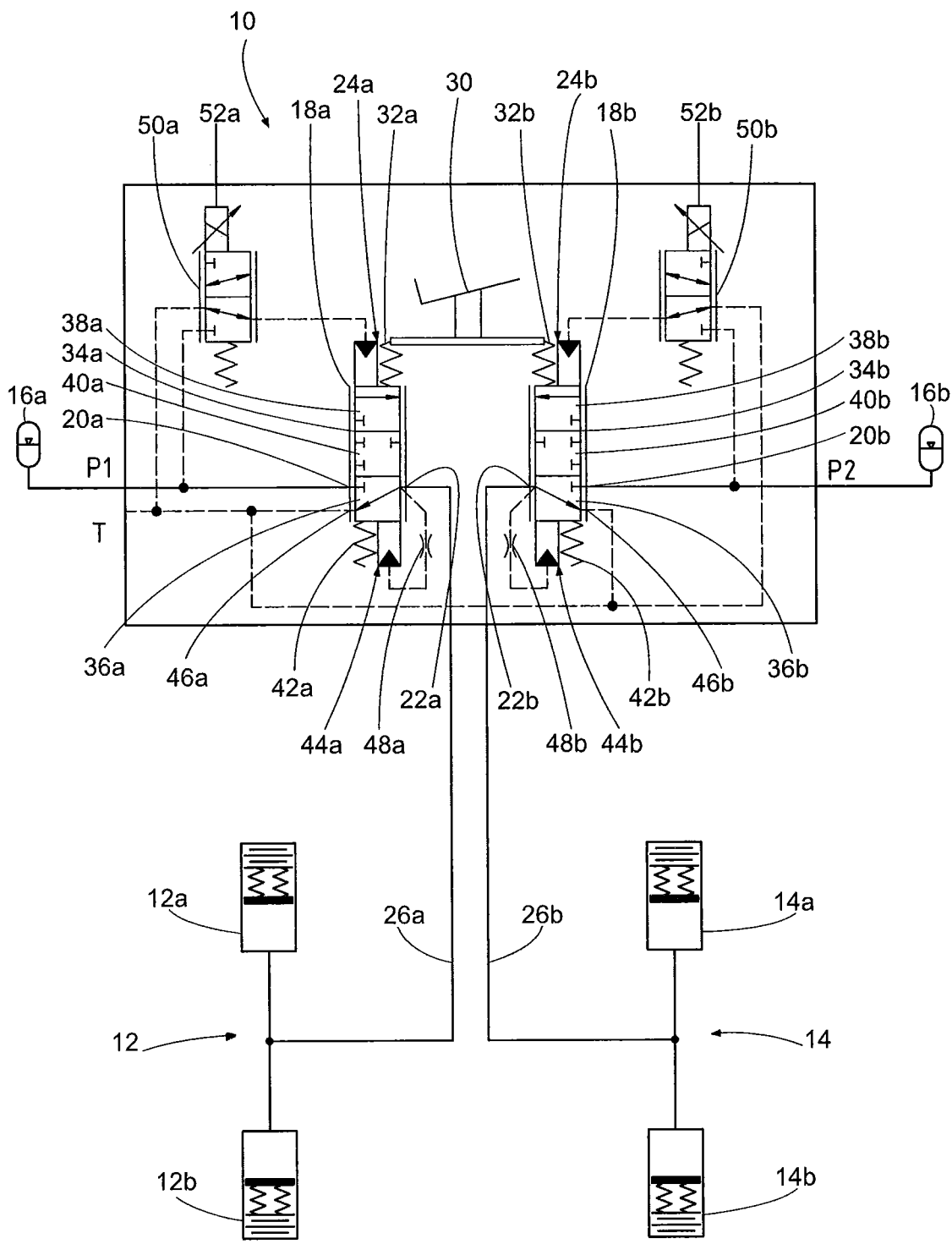
FIG. 1 is a schematic diagram of a hydraulic system according to embodiments of the present disclosure.

FIG. 1 shows a hydraulic system 10 for a vehicle having first brakes 12 and second brakes 14. In the illustrated embodiment shown in FIG. 1, the first brakes 12 comprise a front-right brake 12a and a front-left brake 12b, and the second brakes 14 comprise a rear-right brake 14a and a rear-left brake 14b. In other embodiments of the present disclosure, other combinations of brakes may form the first and second brakes.

The hydraulic system 10 comprises a source of hydraulic fluid 16. The source of hydraulic fluid 16 may comprise a first accumulator 16a and a second accumulator 16b. In some embodiments of the present disclosure, a single accumulator may be used. Alternative sources of hydraulic fluid known to those skilled in the art may also be used with other embodiments of the present disclosure.

The hydraulic system 10 further comprises a first brake valve 18a and a second brake valve 18b. The first brake valve 18a has a pressure inlet 20a, an exhaust outlet 22a and a control inlet 24a. Similarly, the second brake valve 18b has a pressure inlet 20b, an exhaust outlet 22b and a control inlet 24b.

The pressure inlets 20a, 20b of the first and second brake valves 18a, 18b are connected to the source of hydraulic fluid 16. In some embodiments of the present disclosure, the pressure inlet 20a of the first brake valve 18a may be connected to the first accumulator 16a and the pressure inlet 20b of the second brake valve 18b may be connected to the second accumulator 16b. In other embodiments of the present disclosure, the pressure inlets 20a, 20b may be connected to a common accumulator.

The exhaust outlets 22a, 22b of the first and second brake valves 18a, 18b are connected to the first and second brakes 12, 14 via hydraulic lines 26a, 26b, respectively.

The first and second brake valves are arranged in a parallel configuration whereby the control inlets 24a, 24b of the first and second brake valves 18a, 18b are directly responsive to a braking signal from an operator of the vehicle. In the illustrated embodiment shown in FIG. 1, the first and second brake valves 18a, 18b are each responsive to a braking signal in the form of actuation of a foot pedal 30 by an operator of the vehicle. Actuation of the foot pedal 30 compresses springs 32a, 32b. In other embodiments of the present disclosure, the control inlets 24a, 26b may be responsive to a braking signal by other suitable mechanisms, such as a solenoid actuated by an engine control unit in response to an operator pressing a brake pedal.

The first and second brake valves 18a, 18b may each comprise a 3-way 3-position valve. In the embodiment of the present disclosure illustrated in FIG. 1, the first and second brake valves 18a, 18b are the same; for brevity only the first brake valve 18a will be described, however it should be understood that the second brake valve 18b is of the same form. Like reference numerals are used in FIG. 1, with a suffix 'a' appearing on parts of first brake valve 18a and a suffix 'b' appearing on parts of second brake valve 18b.

The first brake valve 18a may have a valve slide 34a movable between a first valve slide position 36a and a second valve slide position 38a with a transition position 40a provided between valve slide positions 36a and 38a.

The valve slide 34a may be biased towards the first valve slide position 36a by a spring 42a provided at a secondary control inlet 44a. When the valve slide 34a is in the first valve slide position 36a, hydraulic fluid flows may be prevented from flowing between the pressure inlet 20a and the exhaust outlet 22a, while the exhaust outlet 22a may be in fluid communication with a drain outlet 46a. In the illustrated embodiment, the first valve slide position 36a may correspond with no braking applied to the first brakes 12.

When the valve slide 34a is in the second valve slide position 38a, the pressure inlet 20a may be in fluid communication with the exhaust outlet 22a to permit hydraulic fluid to flow to the exhaust outlet 22a and hence to the first brakes 12 via the hydraulic line 26a. In the illustrated embodiment, the second valve slide position 38a may correspond with braking being applied to the first brakes 12.

The first brake valve 18a may be a load-sensing valve whereby an orifice 48a is provided between the exhaust outlet 22a and the secondary control inlet 44a. The orifice 48a may be provided internally to the first brake valve 18a. In some embodiments of the present disclosure, it may be preferred that the first and second brake valves 18a, 18b are load-sensing valves, which may reduce provide a smoother operator experience of the brakes 12, 14.

The hydraulic system 10 further comprises a first control valve 50a and a second control valve 50b. The first and second control valves 50a, 50b are each connected to the source of hydraulic fluid 16. The first control valve 50a may be connected to the first accumulator 16a and the second control valve 50b may be connected to the second accumulator 16b. The first and second control valves 50a, 50b are configured to selectively provide hydraulic fluid to the control inlets 24a, 24b of the first and second brake valves 18a, 18b, respectively.

In some embodiments of the present disclosure, the first and second control valves 50a, 50b may each comprise a 3-way 2-position solenoid valve. The first and second control valves 50a, 50b may be responsive to a corresponding first and second control signal 52a, 52b, respectively. The first control valve 50a may selectively provide hydraulic fluid to the control inlet 24a of the first brake valve 18a in response to the first control signal 52a. Similarly second control valve 50b may selectively provide hydraulic fluid to the control inlet 24b of the second brake valve 18b in response to the second control signal 52b.

The valve slides 34a, 34b may be biased towards the second valve slide position 36a, 36b by the springs 42a, 42b. The valve slides 34a, 34b of both brake valves 18a, 18b will be biased towards the second valve slide positions 36a, 36b with no input from foot pedal 30. With no input from foot pedal 30, both springs 32a and 32b maintain foot pedal 30 in the fully retracted position. The valve slides 34a, 34b of both brake valves 18a, 18b will be biased towards the first valve slide positions 38a, 38b when the operator presses the foot pedal 30. The valve slides 34a and 34b may be independently biased towards the first valve slide positions 38a and 38b, respectively, by hydraulic fluid from the corresponding control valve 50a, 50b since the control valves 50a, 50b may be separately controlled via control signals 52a, 52b, respectively. The control signals 52a, 52b may be received from an engine control unit (not shown) and may be permit the first and/or second brakes 12, 14 to be used for braking independently of the operator.

Figure 2:
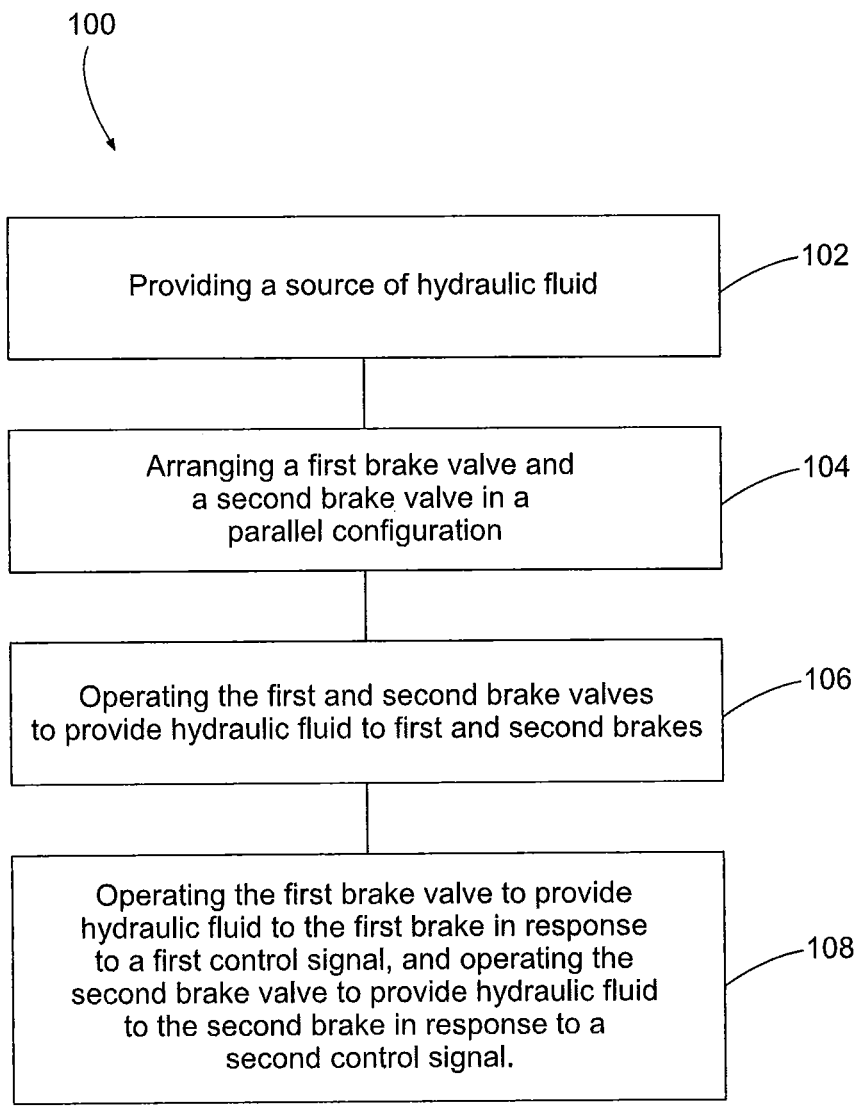
FIG. 2 is a flowchart of a method for controlling hydraulic fluid in a vehicle according to embodiments of the present disclosure.

Referring now to FIG. 2 of the drawings, a method 100 for controlling hydraulic fluid in a vehicle having first and second brakes 12, 14 is shown.

At step 102 a source of hydraulic fluid 16 is provided. Optionally, the source of hydraulic fluid 16 may comprise a first accumulator 16a and a second accumulator 16b, the first brake valve 18a being connected to the first accumulator 16a and the second brake valve 18b being connected to the second accumulator 16b.

At step 104, a first brake valve 18a and a second brake valve 18b are arranged in a parallel configuration, wherein a pressure inlet 20a, 20b of the first and second brake valves 18a, 18b are connected to the source of hydraulic fluid 16, and an exhaust outlet 22a, 22b of the first and second brake valves 18a, 18b are connected to the first and second brakes 12, 14, respectively.

At step 106, operation of the first and second brake valves 18a, 18b is controlled such that the first and second brake valves 18a, 18b provide hydraulic fluid to the first and second brakes 12, 14, respectively, in response to a braking signal from an operator of the vehicle.

At step 108, operation of the first and second brake valves 18a, 18b is controlled such that the first brake valve 18a provides hydraulic fluid to the first brake 12 in response to a first control signal 52a, and the second brake valve 18b provides hydraulic fluid to the second brake 14 in response to a second control signal 52b. The method may comprise providing first and second control valves 50a, 50b responsive to first and second control signals 52a, 52b, respectively, and configuring the first and second control valves 50a, 50b to control operation of the first and second brake valves 18a, 18b to selectively provide hydraulic fluid to the first and second brakes 12, 14, respectively.

In some embodiments of the method of the present disclosure, the first brakes 12 of the vehicle comprise a front-right brake 12a and a front-left brake 12b, and the second brakes 14 of the vehicle comprise a rear-right brake 14a and a rear-left brake 14b.

INDUSTRIAL APPLICATION

The present disclosure provides a hydraulic system for controlling brakes in a vehicle. The hydraulic system 10 may be applicable to vehicles where braking is required to be controlled independently of the operator. The hydraulic system 10 may reduce the number of valves required, and may thereby reduce manufacturing costs and may increase reliability due to requiring fewer components.

What is claimed is:

1. A hydraulic system for a vehicle having first and second brakes, comprising a source of hydraulic fluid, a first brake valve and a second brake valve, the first and second brake valves having a pressure inlet, an exhaust outlet and a control inlet, the hydraulic system characterized by:
the first and second brake valves being arranged in a parallel configuration, wherein the pressure inlet of the first and second brake valves are connected to the source of hydraulic fluid, and the exhaust outlet of the first and second brake valves being connected to the first and second brakes, respectively;
the first and second brake valves being directly responsive to a braking signal from an operator of the vehicle; and
a first control valve and a second control valve, each connected to the source of hydraulic fluid and to the control inlet of the first and second brake valves, respectively, wherein the first control valve is configured to selectively provide hydraulic fluid to the control inlet of the first brake valve in response to a first control signal and the second control valve is configured to selectively provide hydraulic fluid to the control inlet of the second brake valve in response to a second control signal so that the first and second control valves cause the first and second brakes, respectively, to operate independent of each other.

2. The hydraulic system of claim 1, wherein the source of hydraulic fluid comprises a first accumulator and a second accumulator, wherein the first brake valve and the first control valve are connected to the first accumulator and the second brake valve and the second control valve are connected to the second accumulator.

3. The hydraulic system of claim 1, wherein the first brakes of the vehicle comprise a front-left brake and a front-right brake, and the second brakes of the vehicle comprise a rear-left brake and a rear-right brake.

4. The hydraulic system of claim 1, wherein the first and second control valves each comprise a single valve.

5. The hydraulic system of claim 1, wherein the control inlet of the first and second brake valves is directly responsive to a foot-actuated braking signal from an operator of the vehicle.

6. The hydraulic system of claim 1, wherein first and second brake valves each comprise a single valve.

7. The hydraulic system of claim 1, wherein the first and second brake valves each comprise a load-sensing valve.

8. A vehicle comprising the hydraulic system of claim 1.

9. A method for controlling hydraulic fluid in a vehicle having first and second brakes, characterised by:
providing a source of hydraulic fluid;
arranging a first brake valve and a second brake valve in a parallel configuration, wherein a pressure inlet of the first and second brake valves are connected to the source of hydraulic fluid, and an exhaust outlet of the first and second brake valves are connected to the first and second brakes, respectively;
providing first and second control valves responsive to first and second control signals, respectively, with each of the first and second control valves connected to the source of hydraulic fluid and each connected to a control inlet of the first and second brake valves, respectively;
controlling operation of the first and second brake valves such that the first and second brake valves provide hydraulic fluid to the first and second brakes, respectively, in response to a braking signal from an operator of the vehicle; and
controlling operation of the first and second control valves such that the first control valve provides hydraulic fluid to the control inlet of the first brake valve in response to a first control signal, and the second control valve provides hydraulic fluid to the control inlet of the second brake valve in response to a second control signal so that the first and second control valves cause the first and second brakes, respectively, to operate independent of each other.

10. The method of claim 9, wherein the source of hydraulic fluid comprises a first accumulator and a second accumulator, the first brake valve being connected to the first accumulator and the second brake valve being connected to the second accumulator.

11. The method of claim 9, wherein the first brakes of the vehicle comprise a front-left brake and a front-right brake, and the second brakes of the vehicle comprise a rear-left brake and a rear-right brake.

12. A vehicle comprising the method for controlling hydraulic fluid according to claim 9.

* * * * *